(12) United States Patent
Wilson et al.

(10) Patent No.: US 11,597,121 B2
(45) Date of Patent: Mar. 7, 2023

(54) METHOD RECYCLING A ROLL OF ARTIFICIAL TURF

(71) Applicant: Playing Surface Solutions, Inc., Meadville, PA (US)

(72) Inventors: Troy Wilson, Meadville, PA (US); Tyler Wilson, Meadville, PA (US)

(73) Assignee: Playing Surface Solutions, Inc., Meadville, PA (US)

( * ) Notice: Subject to any disclaimer, the term of this patent is extended or adjusted under 35 U.S.C. 154(b) by 534 days.

(21) Appl. No.: 16/729,666

(22) Filed: Dec. 30, 2019

(65) Prior Publication Data

US 2020/0206980 A1 Jul. 2, 2020

Related U.S. Application Data

(60) Provisional application No. 62/786,654, filed on Dec. 31, 2018.

(51) Int. Cl.
| | |
|---|---|
| *B29B 17/02* | (2006.01) |
| *B09B 3/00* | (2022.01) |
| *B29B 17/04* | (2006.01) |
| *B02C 23/20* | (2006.01) |
| *B02C 23/10* | (2006.01) |
| *B29K 21/00* | (2006.01) |
| *B29L 31/00* | (2006.01) |

(52) U.S. Cl.
CPC .............. *B29B 17/02* (2013.01); *B02C 23/10* (2013.01); *B02C 23/20* (2013.01); *B09B 3/00* (2013.01); *B29B 17/04* (2013.01); *B29B 2017/0224* (2013.01); *B29K 2021/00* (2013.01); *B29L 2031/732* (2013.01)

(58) Field of Classification Search
CPC . B29B 17/02; B29B 17/04; B29B 2017/0224; B29B 2017/0234; B09B 3/00; B29L 2031/732; B02C 23/10; B02C 23/14; B02C 23/20
See application file for complete search history.

(56) References Cited

U.S. PATENT DOCUMENTS

| | | | | |
|---|---|---|---|---|
| 9,308,557 | B2 * | 4/2016 | Nicholls | B60P 3/14 |
| 10,117,386 | B1 * | 11/2018 | Wilson | A01G 20/12 |
| 10,889,946 | B1 * | 1/2021 | Mast | B07B 1/4609 |
| 2002/0096583 | A1 * | 7/2002 | Garner | B02C 19/20 |
| | | | | 241/24.17 |
| 2012/0031814 | A1 * | 2/2012 | Hinkel | E01C 13/08 |
| | | | | 209/3 |
| 2013/0017023 | A1 * | 1/2013 | Nicholls | B29B 17/02 |
| | | | | 406/39 |

(Continued)

*Primary Examiner* — Joseph C Rodriguez
(74) *Attorney, Agent, or Firm* — The Webb Law Firm

(57) ABSTRACT

A method is for recycling a roll of artificial turf. The method includes the steps of processing the roll of artificial turf to yield a mixture of a quantity of infill and a quantity of synthetic fibers, the quantity of infill having rubber, sand, and debris, passing the mixture through one or more screens to extract a percentage of the quantity of synthetic fibers from the mixture and yield a first remaining mixture, and substantially separating the first remaining mixture into pieces of rubber of a first volume, pieces of rubber of a second volume greater than the first volume, sand, debris, and the remaining percentage of the quantity of synthetic fibers.

20 Claims, 2 Drawing Sheets

(56) References Cited

U.S. PATENT DOCUMENTS

| | | | |
|---|---|---|---|
| 2016/0067745 A1* | 3/2016 | Andersen | B07B 9/02 |
| | | | 209/21 |
| 2016/0340139 A1* | 11/2016 | Motz | A01G 20/18 |
| 2021/0237317 A1* | 8/2021 | Dubois | B02C 19/186 |
| 2022/0009129 A1* | 1/2022 | Owegeser | B02C 23/02 |

* cited by examiner

METHOD RECYCLING A ROLL OF ARTIFICIAL TURF

CROSS REFERENCE TO RELATED APPLICATION

This application claims the benefit of and claims priority to U.S. Provisional Application Ser. No. 62/786,654, filed on Dec. 31, 2018, and entitled "RUBBER EXTRACTION AND RECYCLING PROCESS".

BACKGROUND OF THE DISCLOSURE

Field of the Disclosure

The present disclosure is related to a method of recycling a roll of artificial turf.

Description of Related Art

Artificial or synthetic turf, such as AstroTurf®, is a surface manufactured from synthetic fibers to look like natural grass. This surface is often used in wide, flat spaces such as sporting arenas, baseball diamonds, or practice fields. Because it does not require the maintenance of natural grass, such as watering and trimming, this surface has also found growing interest in the commercial landscaping market for homes and businesses.

Some situations require artificial turf over natural grass. For instance, in sports domes there is often not enough sunlight for natural grass to grow, so artificial turf is used. Artificial turf is also often preferred over ordinary grass in wet locations because it will not turn to mud after a rainfall.

Artificial turf is constructed from multiple layers. The bottom-most layer is the natural surface of earth. Drainage improvements may be placed in this soil. A padded layer may be placed atop the earth, followed by a water containment membrane and the artificial turf fibers. The artificial turf fibers are often filled in with a mixture of ground rubber pellets and sand (or sometimes silicon). This mixture increases the realistic feel of the surface when athletes perform on the surface, as well as making the turf more impact-resistant and less likely to cause injuries if a person were to fall.

One disadvantage of typical artificial turf is that, during replacement of the turf, the rubber pellets must be discarded along with the sand mixture. The rubber is often of similar consistency to car tires, and this is both wasteful and potentially environmentally hazardous if not disposed of correctly. What is desired is a system or method of reclaiming and reusing the rubber pellets during the reinstallation of a worn-out artificial field or landscaping installation. A method of recycling a roll of artificial turf is therefore provided herein.

SUMMARY OF THE DISCLOSURE

These needs and others are met by embodiments of the disclosed examples or aspects, which are directed to an improved method of recycling a roll of artificial turf.

In one aspect, a method of recycling a roll of artificial turf is provided. The method comprises the steps of processing the roll of artificial turf to yield a mixture of a quantity of infill and a quantity of synthetic fibers, the quantity of infill comprising rubber, sand, and debris; passing the mixture through one or more screens to extract a percentage of the quantity of synthetic fibers from the mixture and yield a first remaining mixture; and substantially separating the first remaining mixture into pieces of rubber of a first volume, pieces of rubber of a second volume greater than the first volume, sand, debris, and the remaining percentage of the quantity of synthetic fibers.

BRIEF DESCRIPTION OF THE DRAWINGS

The above-mentioned and other features and advantages of this disclosure, and the manner of attaining them, will become more apparent and the disclosure itself will be better understood by reference to the following descriptions of embodiments of the disclosure taken in conjunction with the accompanying drawings, wherein.

Corresponding reference characters indicate corresponding parts throughout the several views. The exemplifications set out herein illustrate exemplary aspects of the disclosure, and such exemplifications are not to be construed as limiting the scope of the disclosure in any manner.

DETAILED DESCRIPTION OF THE DISCLOSURE

The following description is provided to enable those skilled in the art to make and use the described embodiments contemplated for carrying out the concept. Various modifications, equivalents, variations, and alternatives, however, will remain readily apparent to those skilled in the art. Any and all such modifications, variations, equivalents, and alternatives are intended to fall within the spirit and scope of the present concept.

The present invention provides methods for recycling a roll of artificial turf. The artificial turf to be subjected to the recycling processes disclosed herein may come from any source. Often, the extracted artificial turf was previously used as athletic fields, although this may not always be the case. Artificial turf is typically made of a back matting material to which synthetic fiber ("grass") are held, and infill is added to the mat, between the synthetic fibers, to provide cushion, resiliency, and durability to the artificial turf.

Figure 1:
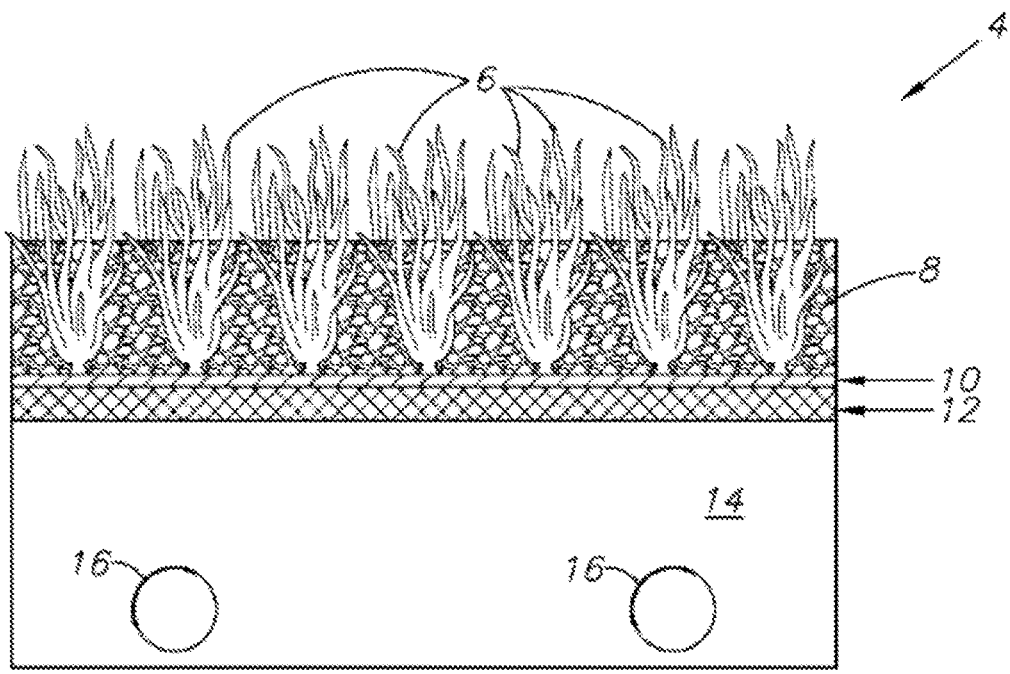
FIG. 1 is a schematic view of a portion of a roll of artificial turf.

For example, FIG. 1 shows a side view of a portion of a roll of artificial turf 4 that may be recycled by methods disclosed herein. The artificial turf 4 includes synthetic fibers 6 that look and feel like natural grass but are often made from nylon, polyethylene, or polypropylene. Infill 8 is dispersed between the artificial fibers 6 to produce a softer surface. The infill 8 may be any material (e.g., without limitation, crumb rubber (SBR, both cryogenic and ambient, coated or uncoated), sand, EPDM, TPE, and the like). The artificial turf 4 shown contains a first layer 10 for containing or removing moisture, a second, shock absorbing layer 12, and a base surface 14 is shown upon which the artificial turf 4 is laid.

Prior to separating the artificial turf into separate components, the artificial turf may be removed from the location at which it was installed. This may be done by any method. For example, it may be particularly useful to use methods disclosed in U.S. Pat. No. 10,117,386. Artificial turf may be removed in strips or pieces which may be then subjected to the recycling processes disclosed herein. As will be further detailed below, the present disclosure provides a method of recycling artificial turf into constituent components for proper disposal. The constituent components may include the synthetic fibers 6, rubber from the infill 8, sand from the infill 8, and debris. As used herein, the term "debris" includes, without limitation, rocks and/or chunks of the layers 10, 12 of the roll of artificial turf 4, which may be made of plastic.

Figure 2:
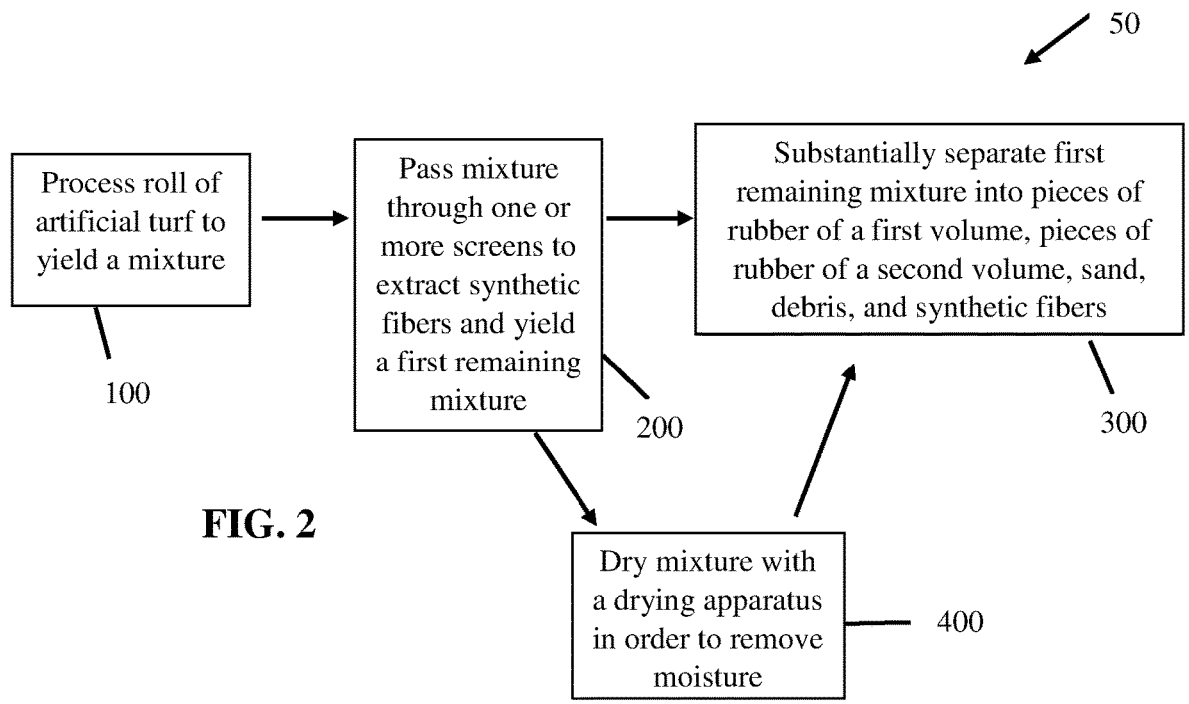
FIG. 2 is a flow diagram of a method of recycling the roll of artificial turf of FIG. 1, in accordance with one non-limiting embodiment of the disclosed concept.

FIG. 2 is a flow diagram of a method 50 of recycling the roll of artificial turf 4 depicted in FIG. 1. Once the artificial turf 4 is obtained after de-installation from, for example, an athletic field, the method 50 may include several steps, including a first step 100 of processing the roll of artificial turf 4 to yield a mixture of a quantity of infill and a quantity of synthetic fibers. The quantity of infill may include rubber, sand, and debris. The method 50 may further have a second step 200 of passing the mixture through one or more screens to extract a percentage of the quantity of synthetic fibers from the mixture and yield a first remaining mixture, and a third step 300 of substantially separating the first remaining mixture into pieces of rubber of a first volume, pieces of rubber of a second volume greater than the first volume, sand, debris, and the remaining percentage of the quantity of synthetic fibers. Optionally, the method 50 may further include a step 400 of drying the mixture with a drying apparatus before step 300 in order to remove moisture from the mixture. In one example embodiment, the drying apparatus is one of a fluidized bed dryer or a rotary dryer. During step 400, dust and debris may be collected at a bag house and disposed of off-site as waste material.

Figure 3:
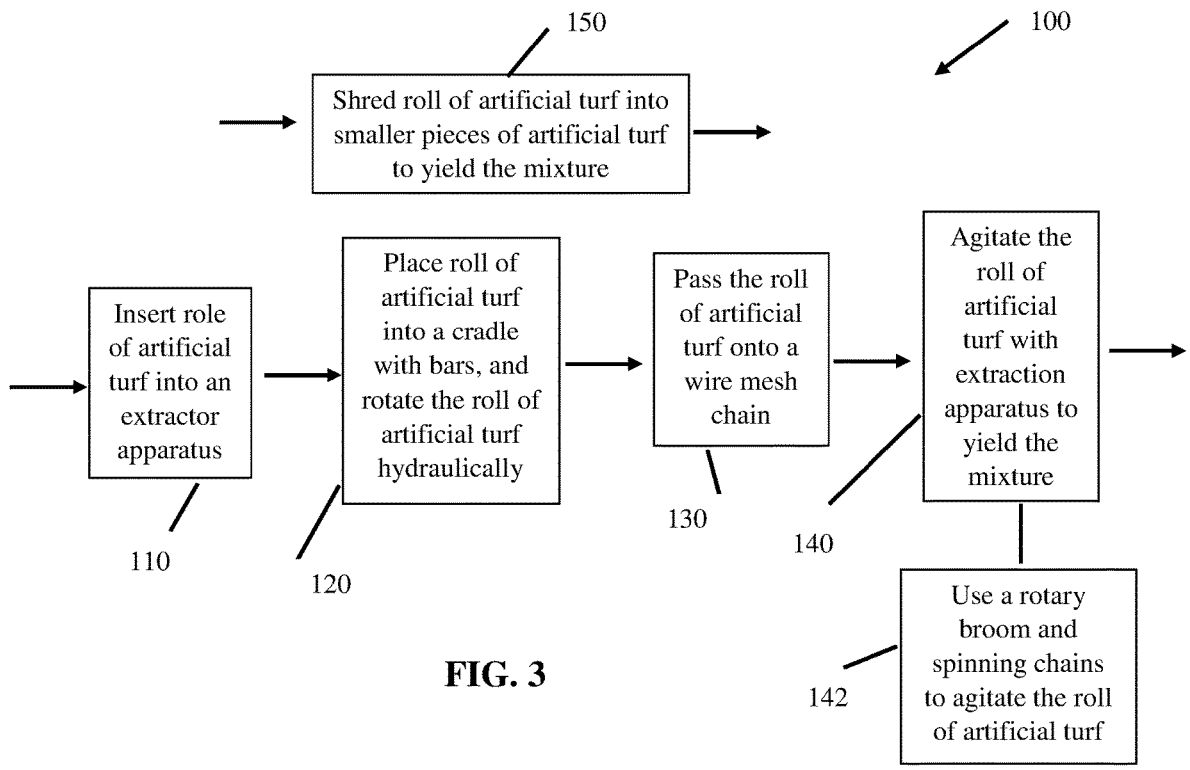
FIG. 3 is a flow diagram of steps of processing the roll of artificial turf in the method of FIG. 2.

In accordance with the disclosed concept, the processing step 100 may be performed in a number of different ways. In a first way, as shown in the flow diagram of the processing step 100, depicted in FIG. 3, the processing step 100 includes a step 110 of inserting the roll of artificial turf 4 into an extractor apparatus, a step 120 of placing the roll of artificial turf 4 into a cradle with bars, and rotating the roll of artificial turf 4 hydraulically, a step 130 of passing the roll of artificial turf 4 onto a wire mesh chain, thereby inverting the roll of artificial turf 4 with respect to the ground, and a step 140 of agitating the roll of artificial turf 4 with the extraction apparatus to yield the mixture. The agitating step 140 may include a step 142 of using a rotary broom and spinning chains to agitate the roll of artificial turf 4. Processing the roll of artificial turf 4 in this manner substantially separates a majority of the infill 8 from the rest of the artificial turf. Furthermore, the remaining artificial turf, which is devoid of infill, may advantageously be sold for reuse, thereby providing an environmentally friendly mechanism to save materials and avoid wasteful offloading in landfills.

In an alternative to processing the roll of artificial turf 4 with the extractor apparatus, the processing step 100 may be performed in a second way, including a step 150 of shredding the roll of artificial turf 4 into smaller pieces of artificial turf to yield the mixture of infill and synthetic fibers. The shredding step 150 may, in one example embodiment, reduce the roll of artificial turf 4 to smaller pieces of shredded turf that have a maximum length of between 1 inch and 5 inches. During the shredding step 150, the roll of artificial turf 4 may be loaded onto a shredder, wherein the artificial turf 4 is shredded with a single drum with carbide teeth on it. The material is continually ground until it is small enough to feed through a 6 inch screen underneath the drum and exported out of the machine by conveyor.

Accordingly, once the mixture of the quantity of infill and the quantity of synthetic fibers has been obtained after the processing step 100, during the passing step 200, the percentage of the quantity of synthetic fibers extracted from the mixture is greater than 85% of all the synthetic fibers initially in the roll of artificial turf 4, preferably being up to about 90% of the synthetic fibers. These synthetic fibers that are extracted may then be washed and dried prior to packaging (e.g., bailing), before being sold for recycling. For example, the synthetic fibers may be recycled into other plastic products. To extract such a high percentage of the synthetic fibers from the mixture, the passing step 200 advantageously includes passing the mixture through either a trommel screen, a flip flop screen, or a deck screen. The passing step 200 may also include passing the mixture through a first screen and a second screen, wherein the first screen has 10 through holes per square inch and the second screen has 20 through holes per square inch, or the first screen has 14 through holes per square inch and the second screen has 30 through holes per square inch. Screens of other sizes are also contemplated by the disclosed concept.

Figure 4:
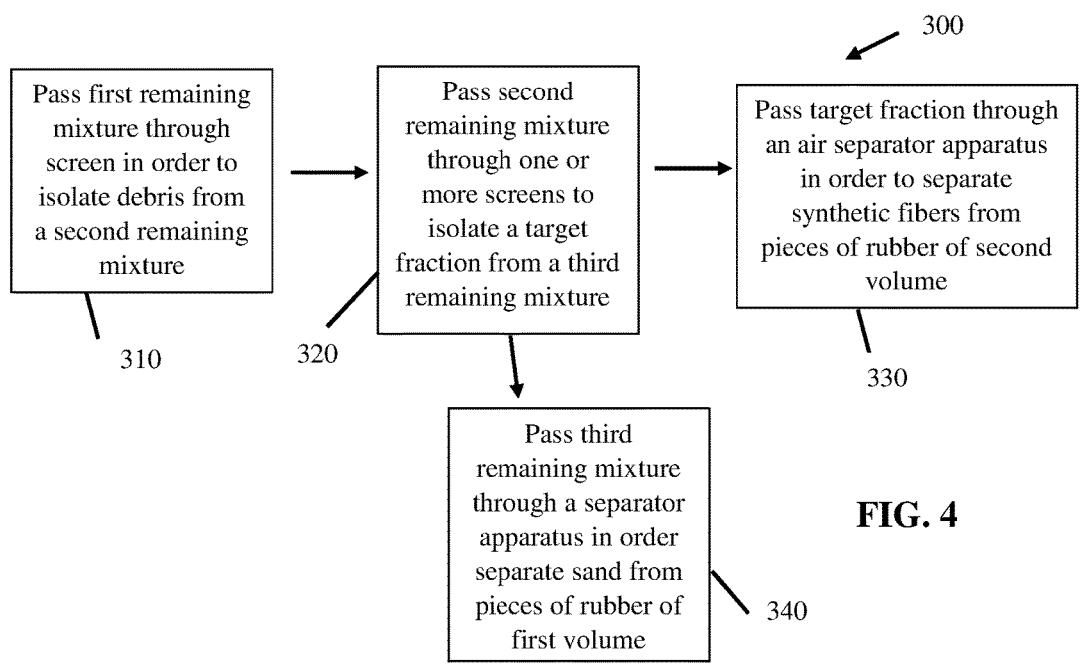
FIG. 4 is a flow diagram of steps of substantially separating a mixture in the method of FIG. 2.

In order to further recycle the artificial turf, the first remaining mixture must be substantially separated into constituent components after the passing step 200. Accordingly, FIG. 4 depicts steps associated with the substantially separating step 300. In one example embodiment, step 300 includes a step 310 of passing the first remaining mixture through a screen in order to isolate debris from a second remaining mixture. The screen may optionally have 10 through holes per square inch in order to isolate the debris. As such, this debris, or waste material, is collected by the screen and is preferably shipped away from the site where the method 50 (FIG. 2) is being performed, for disposal. During this step 310, the second remaining mixture is able to pass through the screen, due to the relatively large through holes (e.g., 10 through holes per square inch) of the screen.

Next, the substantially separating step 300 may further include a step 320 of passing the second remaining mixture through one or more screens to isolate a target fraction from a third remaining mixture. The target fraction may include the pieces of rubber of a predetermined desired size (e.g., the second volume, or relatively large pieces of rubber) and the remaining percentage of the quantity of synthetic fibers that were not screened out during step 200, discussed above. The predetermined desired size of the material is between 0.8 mm and 2 mm. Anything smaller than 0.08 mm will pass through a screen having between 10-20 through holes per square inch. In one example embodiment, a first screen has 10 through holes per square inch and a second screen has 20 through holes per square inch. In a second example embodiment, a first screen has 14 through holes per square inch and a second screen has 30 through holes per square inch. Accordingly, step 320 may optionally include passing the second remaining mixture through either the first screen having 10 through holes per square inch and the second screen having 20 through holes per square inch, or the first screen having 14 through holes per square inch and the second screen having 30 through holes per square inch. During this step 320, finer particles including sand and relatively small pieces of rubber are able to pass through the screens. It will also be appreciated that, in an alternative to step 320, the separating step 300 may further include using an air separator apparatus (e.g., a zig zag air separator) to separate lighter-weighted synthetic fibers from all other heavier components, thereby extracting up to about 95% of the remaining synthetic fibers. In this manner, lighter synthetic fibers may be blown away from the relatively heavy infill. These synthetic fibers may be recycled as discussed above.

In order to further recycle the target fraction and the third remaining mixture, which may include sand and the relatively small pieces of rubber, the step 300 may optionally further include a step 330 and/or a step 340. The step 330 includes passing the target fraction through an air separator apparatus in order to separate the remaining percentage of the quantity of synthetic fibers from the pieces of rubber of the second volume (e.g., the relatively large pieces of rubber). The air separator apparatus may, in one example embodiment, be a zig zag air separator. During this step 330, at least 90%, preferably up to about 95%, of the remaining percentage of the quantity of synthetic fibers are separated from the pieces of rubber of the second volume. These synthetic fibers may be recycled as discussed above. The pieces of rubber of the second volume may advantageously be sold for use as infill in new artificial turf installations, rather than being discarded in a landfill.

The step 340 includes passing the third remaining mixture of sand and relatively small pieces of rubber through a separator apparatus in order to separate sand from the pieces of rubber of the first volume (e.g., the relatively small pieces of rubber). Furthermore, the separator apparatus may, in one example embodiment, be a gravity separator. In another example embodiment, the separator apparatus may be a zig zag air separator. The pieces of rubber of the first volume, e.g., the fine rubber fraction, may advantageously be sold for recycling, e.g., for use as a filler in asphalt applications, rather than being disposed of in a landfill. Additionally, the collected sand fraction has many applications, including repurposing into infill in new artificial turf, use as a top dressing for natural grass fields, and use in concrete manufacturing. Furthermore, it will be appreciated that before the step 340, the third remaining mixture may be dried to remove moisture using a drying apparatus (e.g., without limitation, a fluidized bed dryer or a rotary dryer).

In one aspect of the disclosed concept, a composition containing rubber particles that have been removed from the roll of artificial turf 4 is provided. Non-limiting examples of "rubber" include crumb rubber (SBR, cryogenic or ambient, coated or uncoated), sand, ethylene propylene diene rubbers (EPDM), thermoplastic elastomers (TPE), and the like. In one embodiment, the composition contains less than 1% of artificial turf fibers. In one embodiment, the composition contains less than 5% of sand. In another embodiment, the composition contains from 0.1% to 10% of sand. In one embodiment, the majority of the rubber particles have a particle size between about 0.6 mm and 2 mm. In another embodiment, the majority of the rubber particles have a particle size between about 0.85 mm and 2 mm. In another embodiment, the majority of the rubber particles have a particle size between about 0.6 mm and 1 mm.

In another aspect, a composition containing sand that has been removed from the roll of artificial turf 4 is provided. Non-limiting examples include raw silica-based sand, rounded silica-based sand (e.g., Durafill sand), or any sand commonly used in the artificial turf industry. In one embodiment, the composition contains less than 1% of non-sand materials. In another embodiment, the composition contains from 0.1% to 10% of non-sand materials. In one embodiment, the composition contains less than 1% of artificial turf fibers. In another embodiment, the composition contains from 0.1% to 10% of artificial turf fibers. In one embodiment, the composition contains less than 5% of rubber. In another embodiment, the composition contains from 0.1% to 10% of rubber.

In another aspect, a composition containing synthetic artificial turf fibers that have been removed from artificial turf is provided. As used herein, the term "synthetic turf fiber" means synthetically manufactured fibers for artificial turf. The fibers may be made of any material, e.g., nylon, polyethylene, or polypropylene, any material commonly used as artificial synthetic turf fiber, or combinations thereof. In one embodiment, the composition contains less than 1% of non-fiber materials. In another embodiment, the composition contains from 0.1% to 10% of non-fiber materials. In one embodiment, the composition contains less than 5% of infill materials. In another embodiment, the composition contains from 0.1% to 10% of infill materials.

Accordingly, the processes disclosed herein provide a mechanism for responsible processing of artificial turf, allowing for the components to be recycled into new materials instead of taking up landfill space, and potentially saving consumer money because new rubber does not have to be purchased. The processes disclosed herein allow for high throughput processing of artificial turf that is applicable on an industrial scale.

While this disclosure has been described as having exemplary methods, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

We claim:

1. A method of recycling a roll of artificial turf comprising the steps of:
    processing the roll of artificial turf to yield a mixture of a quantity of infill and a quantity of synthetic fibers, the quantity of infill comprising rubber, sand, and debris;
    passing the mixture through one or more screens to extract a percentage of the quantity of synthetic fibers from the mixture and yield a first remaining mixture; and
    substantially separating the first remaining mixture into pieces of rubber of a first volume, pieces of rubber of a second volume greater than the first volume, sand, debris, and the remaining percentage of the quantity of synthetic fibers.

2. The method according to claim 1, wherein the processing step comprises inserting the roll of artificial turf into an extractor apparatus, and agitating the roll of artificial turf with the extraction apparatus to yield the mixture.

3. The method according to claim 2, wherein the processing step further comprises placing the roll of artificial turf into a cradle with bars, and rotating the roll of artificial turf hydraulically.

4. The method according to claim 2, wherein the agitating step comprises using a rotary broom and spinning chains to agitate the roll of artificial turf.

5. The method according to claim 2, wherein the processing step further comprises passing the roll of artificial turf onto a wire mesh chain, thereby inverting the roll of artificial turf with respect to the ground.

6. The method according to claim 2, further comprising drying the mixture with a drying apparatus before the substantially separating step in order to remove moisture from the mixture.

7. The method according to claim 6, wherein the drying apparatus is selected from the group consisting of a fluidized bed dryer and a rotary dryer.

8. The method according to claim 6, wherein the substantially separating step comprises passing the first remaining mixture through a screen having 10 through holes per square inch in order to isolate debris from a second remaining mixture.

9. The method according to claim 8, wherein the substantially separating step further comprises passing the second remaining mixture through one or more screens to isolate a target fraction from a third remaining mixture, the target fraction comprising the pieces of rubber of the second volume and the remaining percentage of the quantity of synthetic fibers.

10. The method according to claim 9, wherein the passing the second remaining mixture step comprises passing the second remaining mixture through either a first screen having 10 through holes per square inch and a second screen having 20 through holes per square inch, or a first screen having 14 through holes per square inch and a second screen having 30 through holes per square inch.

11. The method according to claim 9, further comprising passing the target fraction through an air separator apparatus in order to separate the remaining percentage of the quantity of synthetic fibers from the pieces of rubber of the second volume.

12. The method according to claim 11, wherein, during the passing the target fraction through an air separator apparatus, at least 90% of the remaining percentage of the quantity of synthetic fibers are separated from the pieces of rubber of the second volume.

13. The method according to claim 11, wherein the air separator apparatus is a zig zag air separator.

14. The method according to claim 9, further comprising passing the third remaining mixture through a separator apparatus in order to separate sand from the pieces of rubber of the first volume.

15. The method according to claim 14, wherein the separator apparatus is a gravity separator.

16. The method according to claim 14, wherein the separator apparatus is a zig zag air separator.

17. The method according to claim 1, wherein the processing step comprises shredding the roll of artificial turf into smaller pieces of artificial turf to yield the mixture.

18. The method according to claim 1, wherein, during the passing step, the percentage of the quantity of synthetic fibers extracted from the mixture is greater than 85%.

19. The method according to claim 18, wherein the passing step comprises passing the mixture through either a trommel screen, a flip flop screen, or a deck screen.

20. The method according to claim 18, wherein the passing step comprises passing the mixture through either a first screen having 10 through holes per square inch and a second screen having 20 through holes per square inch, or a first screen having 14 through holes per square inch and a second screen having 30 through holes per square inch.

\* \* \* \* \*

UNITED STATES PATENT AND TRADEMARK OFFICE
CERTIFICATE OF CORRECTION

PATENT NO. : 11,597,121 B2
APPLICATION NO. : 16/729666
DATED : March 7, 2023
INVENTOR(S) : Wilson et al.

It is certified that error appears in the above-identified patent and that said Letters Patent is hereby corrected as shown below:

On the Title Page

Item (54), Lines 3-4, and in the Specification Column 1, Lines 1-2, delete "METHOD RECYCLING A ROLL OF ARTIFICIAL TURF" and insert -- METHOD OF RECYCLING A ROLL OF ARTIFICIAL TURF --

Item (57), Column 2, Abstract, Lines 1-4, delete "A method is for recycling" and insert -- A method for recycling --

Signed and Sealed this
Twenty-seventh Day of June, 2023

Katherine Kelly Vidal
*Director of the United States Patent and Trademark Office*